(12) United States Patent
Ringk et al.

(10) Patent No.: US 11,799,120 B2
(45) Date of Patent: Oct. 24, 2023

(54) METHOD FOR FORMING A THERMALLY CONDUCTIVE CONNECTION BETWEEN A PLURALITY OF BATTERY CELLS AND A TEMPERATURE-REGULATING BODY, AND BATTERY MODULE

(71) Applicant: Robert Bosch GmbH, Stuttgart (DE)

(72) Inventors: Andreas Ringk, Bamberg (DE); Anton Ringel, Bamberg (DE)

(73) Assignee: Robert Bosch GmbH, Stuttgart (DE)

( * ) Notice: Subject to any disclaimer, the term of this patent is extended or adjusted under 35 U.S.C. 154(b) by 297 days.

(21) Appl. No.: 17/189,400

(22) Filed: Mar. 2, 2021

(65) Prior Publication Data

US 2021/0273254 A1    Sep. 2, 2021

(30) Foreign Application Priority Data

Mar. 2, 2020   (DE) .......................... 102020202646.7

(51) Int. Cl.
*B29C 65/52*      (2006.01)
*B32B 37/12*      (2006.01)
(Continued)

(52) U.S. Cl.
CPC ............. *H01M 10/04* (2013.01); *B29C 65/52* (2013.01); *B32B 7/12* (2013.01); *B32B 7/14* (2013.01);
(Continued)

(58) Field of Classification Search
CPC .. H01M 10/04; H01M 10/647; H01M 10/652; H01M 10/653; H01M 10/6554; H01M 6/42; H01M 6/5038; H01M 10/0404; H01M 10/60; H01M 10/61; H01M 10/613; H01M 10/615; H01M 10/617; H01M 10/62; H01M 10/625; H01M 10/643;
(Continued)

(56) References Cited

U.S. PATENT DOCUMENTS

| 10,177,423 B2 | 1/2019 | Heeg et al. | |
| 2020/0006728 A1* | 1/2020 | Park ..................... | H01M 10/653 |
| 2022/0093991 A1* | 3/2022 | Cournoyer .......... | H01M 10/613 |

FOREIGN PATENT DOCUMENTS

| DE | 102018005234 A1 | 1/2019 |
| DE | 102019208805 B3 | 8/2020 |

* cited by examiner

*Primary Examiner* — Michael A Tolin
(74) *Attorney, Agent, or Firm* — Michael Best & Friedrich LLP

(57) ABSTRACT

A method for forming a thermally conductive connection between a plurality of battery cells (2) and a temperature-regulating body (1) of a battery module (100), wherein, in a first method step, an adhesive (3) comprising at least one first component (31) and at least one second component (32) is applied to the temperature-regulating body (1) or to the plurality of battery cells (2), wherein a first proportion (41) of the at least one first component (31) and/or a second proportion (42) of the at least one second component (32) is changed during the application of the adhesive (3) over the temperature-regulating body (1) or the plurality of battery cells (2), wherein, in a second method step, the plurality of battery cells (2) is connected to the temperature-regulating body (1) in such a way that an inhomogeneous material bond is formed between the plurality of battery cells (2) and the temperature-regulating body (1).

14 Claims, 4 Drawing Sheets

(51) Int. Cl.
    *B32B 7/12*           (2006.01)
    *B32B 7/14*           (2006.01)
    *H01M 10/04*         (2006.01)
    *H01M 10/6554*      (2014.01)

(52) U.S. Cl.
    CPC ...... *B32B 37/1284* (2013.01); *B32B 37/1292*
        (2013.01); *H01M 10/6554* (2015.04); *B32B*
        *2457/10* (2013.01); *C09J 2203/33* (2013.01)

(58) Field of Classification Search
    CPC ...... H01M 10/655; Y02E 60/10; Y02P 70/50;
        B29C 65/48; B29C 65/4855; B29C 65/52;
        B29C 65/524; B32B 7/12; B32B 7/14;
        B32B 37/12; B32B 37/1284; B32B
        37/1292; B32B 2457/10; C09J 5/00; C09J
        2203/33
    See application file for complete search history.

METHOD FOR FORMING A THERMALLY CONDUCTIVE CONNECTION BETWEEN A PLURALITY OF BATTERY CELLS AND A TEMPERATURE-REGULATING BODY, AND BATTERY MODULE

BACKGROUND OF THE INVENTION

The invention proceeds from a method for forming a thermally conductive connection between a plurality of battery cells and a temperature-regulating body. An object of the present invention is also a battery module formed by such a method.

It is known from the prior art that battery modules can consist of a plurality of individual battery cells which can be electrically conductively connected to one another in series and/or in parallel, with the result that the individual battery cells are interconnected to form the battery module.

Furthermore, such battery modules are interconnected to form batteries or battery systems.

Battery modules or batteries of this type moreover usually comprise a temperature-regulating system in order to be able to cool or heat the plurality of battery cells. In this respect, it is known that such temperature-regulating systems comprise temperature-regulating bodies, which are thermally conductively connected to the plurality of battery cells. By way of example, a material bond between the temperature-regulating body and the plurality of battery cells can be formed here.

SUMMARY OF THE INVENTION

The method according to the invention offers the advantage that a material bond can be formed between a plurality of battery cells and a temperature-regulating body, in which material bond it is possible for the adhesive surfaces thereof and thus for example likewise the adhesive forces thereof to be distributed inhomogeneously. As a result, the robustness, flexibility and thermal conductivity of the material bond can be adapted optimally to a respectively required thermal behaviour, for example of a battery module.

For this purpose, according to the invention, a method for forming a thermally conductive connection between a plurality of battery cells and a temperature-regulating body of a battery module is provided. In this respect, in a first method step, an adhesive is applied to the temperature-regulating body or to the plurality of battery cells.

The adhesive comprises in this case at least one first component and at least one second component. Furthermore, a first proportion of the at least one first component and/or one second proportion of the at least one second component is changed during the application of the adhesive over the temperature-regulating body or the plurality of battery cells.

In a second method step, the plurality of battery cells is connected, in particular thermally conductively connected, to the temperature-regulating body in such a way that an inhomogeneous material bond is formed between the plurality of battery cells and the temperature-regulating body.

In particular, such a method according to the invention offers the advantage that the material bond is inhomogeneously formed in such a way that an inhomogeneity forms in a plane arranged parallel to that surface of the temperature-regulating body which is thermally conductively connected to the plurality of battery cells. In particular, such a plane should be referred to as the connecting plane.

It should be pointed out at this juncture that the inhomogeneity of the material bond in addition to the adhesive force can also be targeted at any properties, such as for example a thermal conductivity, a hardness, an elasticity or a resistance to chemicals.

An inhomogeneous material bond makes it possible to form gradients of these different properties over the connecting plane.

In particular, it is also possible to form any desired gradient patterns.

A suitable selection of the at least one first component and the at least one second component makes it possible to adapt these gradients reliably to respectively desired requirements.

The at least one first component of the adhesive and the at least one second component of the adhesive are expediently mixed with one another before the application. This offers the advantage that a reliable ratio of the first proportion of the at least one first component to the second proportion of the at least one second component can be obtained, for example, by an additional mixing device. Moreover, such a mixing operation makes it possible to ensure that an optimum adhesive force is formed.

An object of the present invention is furthermore also a further method for forming a thermally conductive connection between the plurality of battery cells and the temperature-regulating body of a battery module. In this respect, in a first method step, the adhesive is applied to the temperature-regulating body or to the plurality of battery cells. The adhesive likewise comprises at least one first component and at least one second component. Furthermore, the at least one first component and the at least one second component are applied one on top of the other in a height direction. It should be pointed out at this juncture that one on top of the other should be understood to mean that the first component is arranged above the second component in a height direction which is arranged for example perpendicularly to the connecting plane described in the introduction. Furthermore, in a second method step, the plurality of battery cells is connected, in particular thermally conductively connected, to the temperature-regulating body in such a way that an inhomogeneous material bond is formed between the plurality of battery cells and the temperature-regulating body.

This method offers the particular advantage that a material bond which is inhomogeneous in a height direction can be formed. This makes it possible, for example, also to form an inhomogeneity in the height direction in addition to formation in the connecting plane.

In particular, the formation of the inhomogeneous material bond can be assisted by a pressing-together operation in both methods of the present invention. For this purpose, for example, the plurality of battery cells can be connected to the temperature-regulating body under the effect of pressure. It may also be sufficient to use only the dead weight of the plurality of battery cells or of the temperature-regulating body.

It is particularly expedient when the adhesive in a first region is applied in such a way that the first proportion of the at least one first component is higher than the second proportion of the at least one second component and the adhesive in a second region is applied in such a way that the second proportion of the at least one second component is higher than the first proportion of the at least one first component.

As a result, an inhomogeneous material bond with an inhomogeneity in the connecting plane can be formed in a particularly reliable manner.

It is in particular expedient here when the at least one first component forms a lower adhesive force than the at least one second component, and that the first region is arranged closer to a peripheral region of the temperature-regulating body or the plurality of battery cells than the second region. A consequently formed inhomogeneity in the connecting plane makes it possible to establish gradients which can reduce or even avoid inhomogeneous loads, for example stresses, within the material bond that occur during the operation of a battery module.

A design in which the at least one first component forms a lower adhesive force than the at least one second component makes it possible to reduce or even avoid a stress caused by different coefficients of thermal expansion of the temperature-regulating body and the plurality of battery cells in the first region. In particular, it is expedient when the at least one first component has a softer form than the at least one second component.

By way of example, the at least one first component can be a comparatively soft component with a comparatively low thermal conductivity and the at least one second component can be a comparatively hard component with a comparatively high thermal conductivity.

This makes it possible to adapt the material bond optimally to the needs of the thermally conductive connection between the plurality of battery cells and the temperature-regulating body.

It should be pointed out at this juncture that an application to the plurality of battery cells should be understood to mean that the plurality of battery cells together forms a side surface, which is thermally conductively connected to the temperature-regulating body. In particular, end faces of a plurality of battery cells that have a prismatic form these side surfaces.

It is advantageous when the adhesive is applied in a uniformly distributed manner. In particular, the adhesive is applied to the temperature-regulating body in a manner uniformly distributed over the temperature-regulating body, or is applied to the plurality of battery cells in a manner uniformly distributed over the plurality of battery cells.

This makes it possible to form a reliable thermally conductive connection between the plurality of battery cells and the temperature-regulating body.

It is also advantageous when the adhesive is applied with a plurality of portions arranged parallel to one another. This makes it possible to apply the adhesive with a particularly uniform distribution.

It is furthermore advantageous when the adhesive is applied in a continuously running strand. This makes it possible to design a comparatively quick application of the adhesive.

Overall, a method according to the invention offers the advantage that extra costs and longer process times can be avoided and the method is overall also suitable for series production.

In general, it is also pointed out that the adhesive is of course not restricted to the at least one first component and the at least one second component. It is possible that the adhesive comprises a further plurality of different components.

It is preferable for the at least one first component and/or the at least one second component to be selected from an epoxy, acrylate, silicone or urea.

An object of the present invention is also a battery module which comprises a plurality of battery cells and a temperature-regulating body. The plurality of battery cells and the temperature-regulating body are materially bonded inhomogeneously to one another here. This connection is in this respect formed by a method which was described above.

BRIEF DESCRIPTION OF THE DRAWINGS

Exemplary embodiments of the invention are illustrated in the drawings and explained in more detail in the following description.

In the figures.

DETAILED DESCRIPTION

Figure 1:
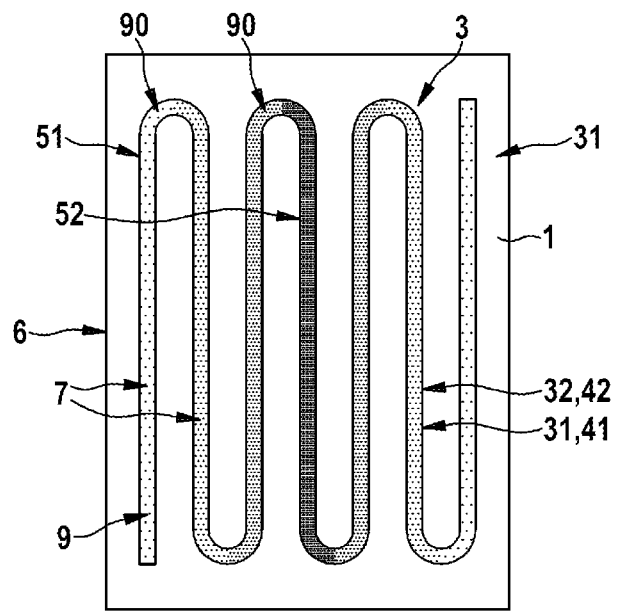
FIG. 1 shows a plan view of a temperature-regulating body after carrying out a first method step.

FIG. 1 shows a plan view of a temperature-regulating body 1 after carrying out a first method step.

In this respect, an adhesive 3 was applied to the temperature-regulating body 1 during the first method step. It should be pointed out at this juncture that it is also possible to apply the adhesive 3 to a plurality of battery cells 2, which cannot be seen in FIG. 1. In this case, the adhesive 3 comprises a first component 31 and a second component 32. By way of example, in this respect the first component 31 and the second component 32 can be selected from an epoxy, acrylate, silicone or urea.

The adhesive 3 was applied here during the first method step in such a way that a first proportion 41 of the first component 31 was changed during the application of the adhesive 3 over the temperature-regulating body 1 and that a second proportion 42 of the second component 32 was changed during the application of the adhesive 3 over the temperature-regulating body 1.

As a result, the temperature-regulating body 1 has different regions which each have different first proportions 41 and different second proportions 42. The distribution of the different proportions is indicated here by a differently pronounced hatching of the adhesive 3. In particular, a dulled hatching means a comparatively high proportion of the first component 31 of the adhesive 3.

In particular, the temperature-regulating body 1 has a first region 51 in which the adhesive 3 was applied in such a way that the first proportion 41 of the first component 31 is higher than the second proportion 42 of the second component 32.

In particular, the temperature-regulating body 1 has a second region 52 in which the adhesive 3 was applied in such a way that the second proportion 42 of the second component 32 is higher than the first proportion 41 of the second component 31.

It can be seen here from FIG. 1, for example, that the first region 51 is arranged closer to a peripheral region 6 of the temperature-regulating body 1 than the second region 52.

In the process, in the exemplary embodiment illustrated in FIG. 1, the first component 31 forms a lower adhesive force than the second component 32.

FIG. 1 moreover shows that the adhesive 3 has been applied in a uniformly distributed manner. In this respect, the adhesive 3 can have been applied, for example, with a plurality of portions 7 which are arranged parallel to one another.

FIG. 1 furthermore also shows that the adhesive 3 can have been applied, for example, in a continuously running strand 9. In particular, the plurality of portions 7 which are arranged parallel to one another can have been connected to one another for this purpose by means of a connection 90 of semicircular form.

It is possible in this respect that the first component 31 of the adhesive 3 and the second component 32 of the adhesive 3 have been mixed with one another before the application.

Figure 2:
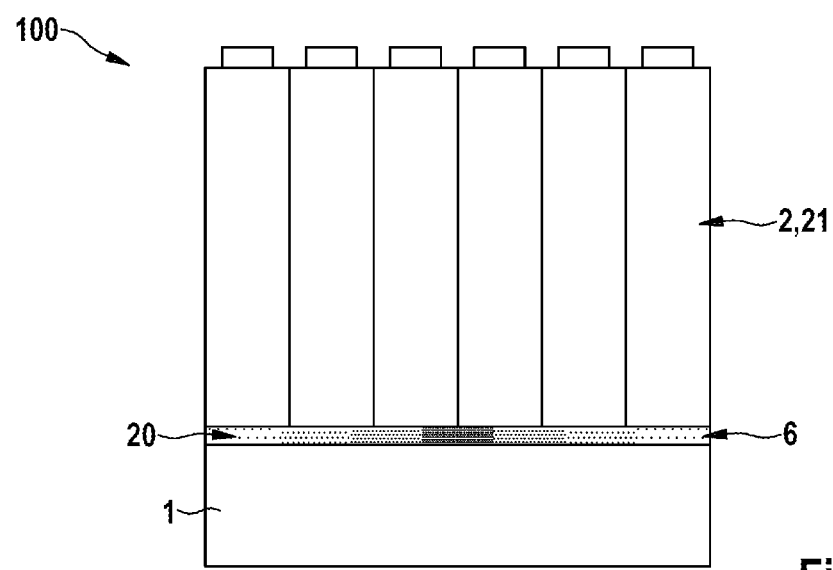
FIG. 2 shows a side view of a configuration of a battery module according to the invention.

FIG. 2 shows a side view of a configuration of a battery module 100 according to the invention.

In this case, the battery module 100 comprises a plurality of battery cells 2 and the temperature-regulating body 1 already illustrated in FIG. 1. The plurality of battery cells 2 and the temperature-regulating body 1 are inhomogeneously materially bonded to one another here.

To produce the inhomogeneous material bond, in a second method step, the plurality of battery cells 2 was connected, in particular thermally conductively connected, to the temperature-regulating body 1 in such a way that the adhesive 3 applied to the temperature-regulating body 1 is arranged between the plurality of battery cells 2 and the temperature-regulating body 1. As a result, the adhesive 3 is distributed uniformly between the plurality of battery cells 2 and the temperature-regulating body 1. In particular, the result of this is that the entire temperature-regulating body 1 and the plurality of battery cells 2 are covered with adhesive 3. The material bond between the plurality of battery cells 2 and the temperature-regulating body 1 is formed inhomogeneously as a result.

The inhomogeneity is also indicated here by a different hatching.

It should be pointed out at this juncture that in particular the plurality of battery cells 2 together form a side surface 20, to which for example the adhesive 3 is applied and which furthermore is thermally conductively connected to the temperature-regulating body 1. The battery cells 2 are here for example in the form of prismatic battery cells, with the result that the bottom end faces thereof together form the side surfaces 20.

In addition, the peripheral region 6 is also shown, which is arranged adjacent to a battery cell 2, 21 arranged at the ends.

Figure 3:
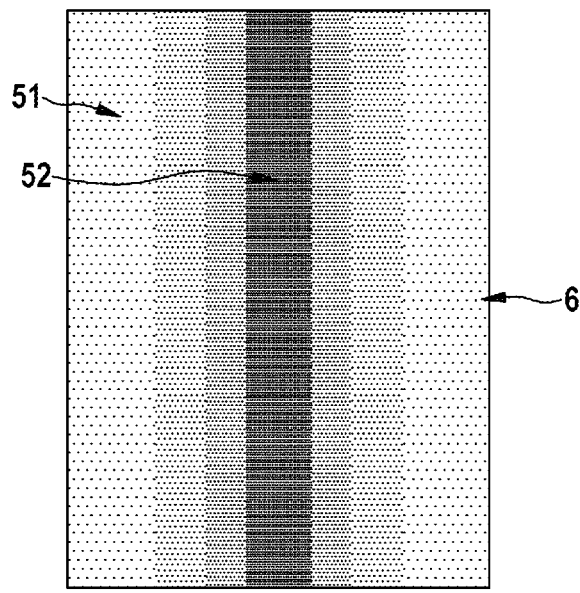
FIG. 3 shows a plan view of a material bond according to the embodiment of the battery module shown in FIG. 2.

FIG. 3 shows a plan view of the material bond between the plurality of battery cells 2 and the temperature-regulating body 1, which is formed in accordance with the material bond as per FIG. 2. Expressed in other words, this means that that inhomogeneous material bond is shown which was produced *by the method according to the invention from the temperature-regulating body 1 as per FIG. 1.

In particular, the first region 51 and the second region 52 can be seen here. Furthermore, the peripheral region 6 is also shown.

Figure 4:
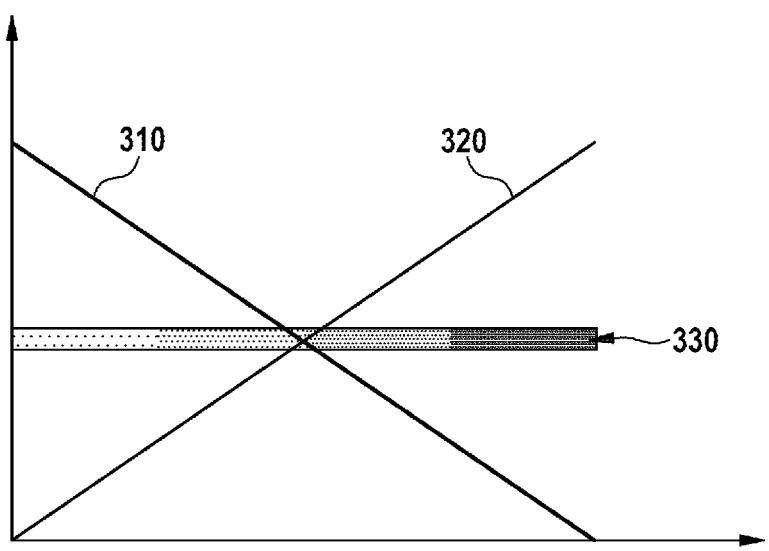
FIG. 4 shows an illustration of the application of different proportions of a first component and a second component.

FIG. 4 shows an illustration of the application of different proportions 41, 42 of a first component 31 and a second component 32.

In this respect, a first volumetric flow rate 310 of the first component 31, a second volumetric flow rate 320 of the second component 32 and an overall volumetric flow rate 330 are applied over time. The overall volumetric flow rate 330 results from the addition of the first volumetric flow rate 310 to the second volumetric flow rate 320.

It can be seen here that, for example, the first volumetric flow rate 310 decreases over time and the second volumetric flow rate 320 increases over time. In this example, the overall volumetric flow rate 330 remains constant over time.

As a result, for example, an adhesive 3 can be applied which has a higher first proportion 41 of the first component 31 at the start of the application according to FIG. 4 that is shown by way of example, and has a higher second proportion 42 of the second component 32 toward the end. It should be pointed out at this juncture that the first volumetric flow rate 310 and the second volumetric flow rate 320 can be varied as desired over time and the linear profile shown is illustrated in particular only by way of example. It is also not imperatively necessary for the overall volumetric flow rate 330 to be constant over time.

Figure 5:
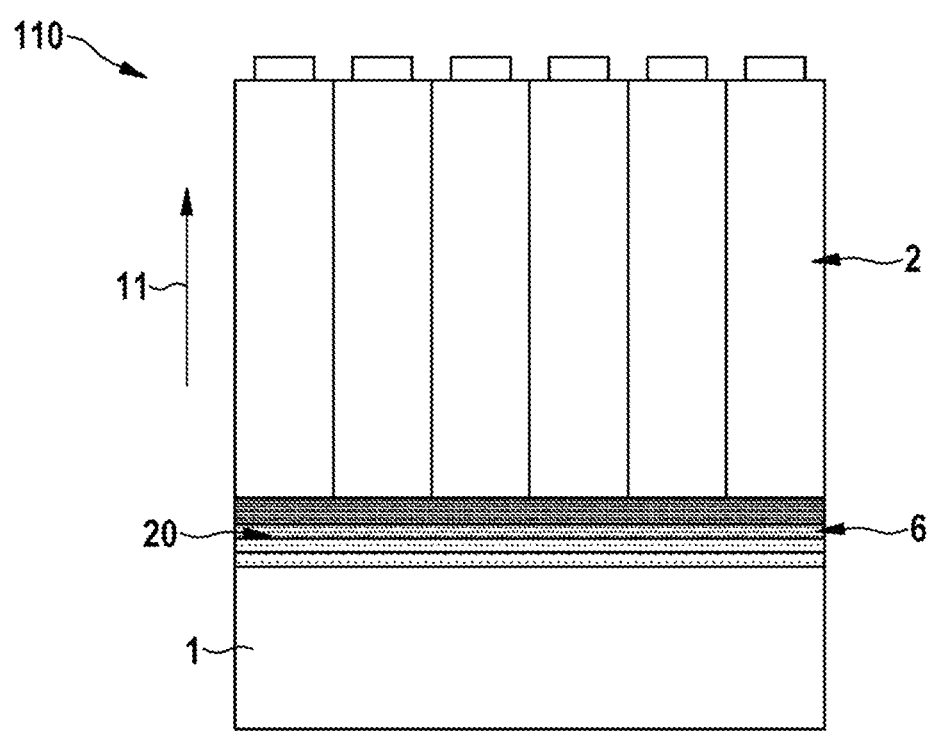
FIG. 5 shows a side view of a configuration of a further battery module according to the invention and FIGS. 6a) through 6f) show further examples of possible material bonds.

FIG. 5 shows a side view of an embodiment of a further battery module 110 according to the invention. The battery module 110 shown in FIG. 5 differs from the battery module 100 shown in FIG. 2 in that the material bond between the plurality of battery cells 2 and the temperature-regulating body 1 has an inhomogeneity in a height direction 11.

To produce such a battery module 110, in particular to form the thermally conductive connection between the plurality of battery cells 2 and the temperature-regulating body 1 of the battery module 110, in the first method step and deviating from the illustration in FIG. 1, the first component 31 and the second component 32 are applied one on top of the other in the height direction 11. By way of example, for this purpose the second component 32 is applied above the first component 31 in the height direction 11.

In a second method step, in a manner corresponding to the production of the battery module 100 as per FIGS. 1 to 3, the plurality of battery cells 2 is connected to the temperature-regulating body 1 in such a way that the inhomogeneous material bond is formed between the plurality of battery cells 2 and the temperature-regulating body 1.

FIG. 6 shows further examples of material bonds, all of which have an inhomogeneous form.

Figure 6C:
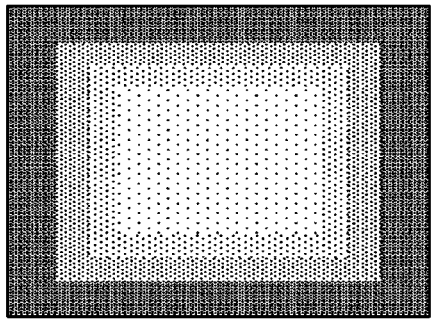
Figure 6B:
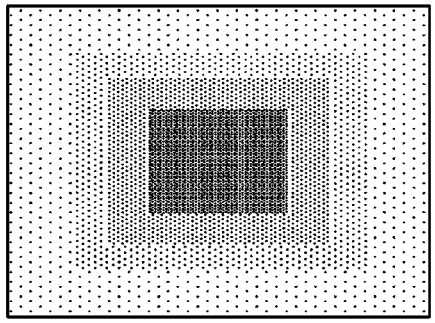
Figure 6A:
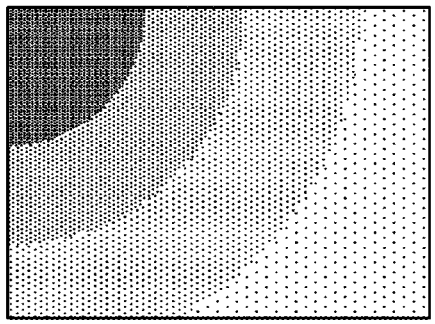

By way of example, FIG. 6a shows an illustration in which a gradient surface of the distribution between the first proportion 41 of the first component 31 and the second proportion 42 of the second component 32 rises, or decreases, running in a manner proceeding radially from a corner point.

By way of example, FIG. 6b shows an illustration in which a gradient surface of the distribution between the first proportion 41 of the first component 31 and the second proportion 42 of the second component 32 partially has a star-shaped pattern.

By way of example, FIG. 6c shows an illustration in which a gradient surface of the distribution between the first proportion 41 of the first component 31 and the second proportion 42 of the second component 32 partially has a window-shaped pattern.

Figure 6F:
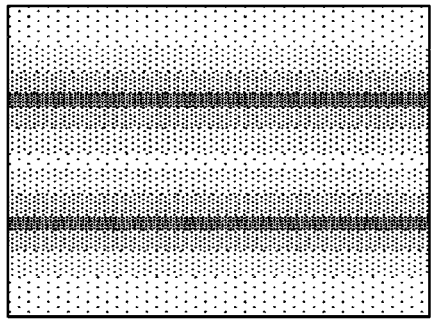
Figure 6E:
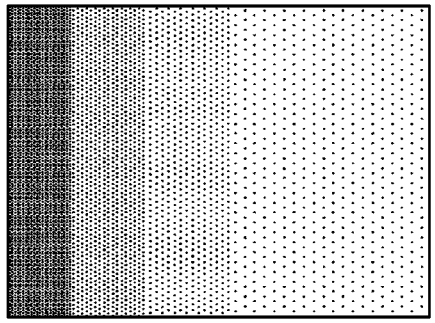
Figure 6D:
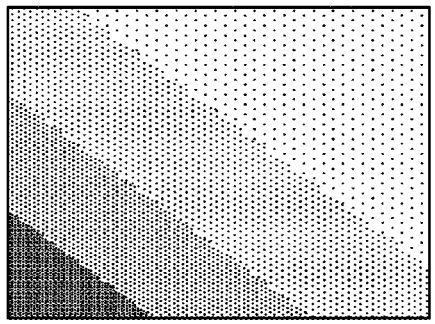

By way of example, FIG. 6d shows an illustration in which a gradient surface of the distribution between the first proportion 41 of the first component 31 and the second proportion 42 of the second component 32 rises, or decreases, parallel to a connection of two opposite corner points.

By way of example, FIG. 6e shows an illustration in which a gradient surface of the distribution between the first proportion 41 of the first component 31 and the second proportion 42 of the second component 32 rises, or decreases, parallel to a connection of two adjacent corner points.

By way of example, FIG. 6f shows an illustration in which a gradient surface of the distribution between the first proportion 41 of the first component 31 and the second proportion 42 of the second component 32 rises, or decreases, parallel to a connection of two adjacent corner points, forming a plurality of high and low planes.

The invention claimed is:

1. A method for forming a thermally conductive connection between a plurality of battery cells (2) and a temperature-regulating body (1) of a battery module (100), the method comprising
in a first method step, applying an adhesive (3) comprising at least one first component (31) and at least one second component (32) to the temperature-regulating body (1) or to the plurality of battery cells (2), wherein a first proportion (41) of the at least one first component (31) and/or a second proportion (42) of the at least one second component (32) is changed during the application of the adhesive (3) to the temperature-regulating body (1) or to the plurality of battery cells (2), and
in a second method step, connecting the plurality of battery cells (2) to the temperature-regulating body (1) in such a way that an inhomogeneous material bond is formed between the plurality of battery cells (2) and the temperature-regulating body (1).

2. The method according to claim 1, wherein the at least one first component (31) of the adhesive (3) and the at least one second component (32) of the adhesive (3) are mixed with one another before the first method step.

3. The method according to claim 1, wherein the adhesive (3) in a first region (51) is applied in such a way that the first proportion (41) of the at least one first component (31) is higher than the second proportion (42) of the at least one second component (32) and the adhesive (3) in a second region (52) is applied in such a way that the second proportion (42) of the at least one second component (32) is higher than the first proportion (41) of the at least one first component (31).

4. The method according to claim 1, wherein the adhesive (3) is applied in a uniformly distributed manner.

5. The method according to claim 1, wherein the adhesive (3) is applied with a plurality of portions (9) which are arranged parallel to one another.

6. The method according to claim 1, wherein the adhesive (3) is applied in a continuously running strand (9).

7. The method according to claim 1, wherein the at least one first component (31) and/or the at least one second component (32) are selected from an epoxy, acrylate, silicone or urea.

8. A method for forming a thermally conductive connection between a plurality of battery cells (2) and a temperature-regulating body (1) of a battery module (110), the method comprising:
in a first method step, an adhesive (3) comprising at least one first component (31) and at least one second component (32) is applied to the temperature-regulating body (1) or to the plurality of battery cells (2), wherein the at least one first component (31) and the at least one second component (32) are applied one on top of the other in a height direction (11), wherein in a second method step, the plurality of battery cells (2) is connected to the temperature-regulating body (1) in such a way that an inhomogeneous material bond is formed between the plurality of battery cells (2) and the temperature-regulating body (1).

9. The method according to claim 8, wherein the adhesive (3) in a first region (51) is applied in such a way that a first proportion (41) of the at least one first component (31) is higher than a second proportion (42) of the at least one second component (32) and the adhesive (3) in a second region (52) is applied in such a way that the second proportion (42) of the at least one second component (32) is higher than the first proportion (41) of the at least one first component (31).

10. The method according to claim 8, wherein the at least one first component (31) forms a lower adhesive force than the at least one second component (32) and in that a first region (51) is arranged closer to a peripheral region (6) of the temperature-regulating body (1) or the plurality of battery cells (2) than a second region (52).

11. The method according to claim 8, wherein the adhesive (3) is applied in a uniformly distributed manner.

12. The method according to claim 8, wherein the adhesive (3) is applied with a plurality of portions (9) which are arranged parallel to one another.

13. The method according to claim 8, wherein the adhesive (3) is applied in a continuously running strand (9).

14. The method according to claim 8, wherein the at least one first component (31) and/or the at least one second component (32) are selected from an epoxy, acrylate, silicone or urea.

* * * * *